United States Patent [19]

Harwell

[11] Patent Number: 4,977,860
[45] Date of Patent: Dec. 18, 1990

[54] STAY ASSEMBLY FOR TETHERING ANIMALS

[76] Inventor: Robert A. Harwell, Rte. 2, P.O. Box 180-A, Johnsonville, S.C. 29555

[21] Appl. No.: 480,490

[22] Filed: Feb. 16, 1990

Related U.S. Application Data

[63] Continuation-in-part of Ser. No. 364,890, Jun. 12, 1989.

[51] Int. Cl.⁵ .............................................. A01K 27/00
[52] U.S. Cl. ...................................... 119/109; 119/110
[58] Field of Search ................ 119/106, 114, 110, 109

[56] References Cited

U.S. PATENT DOCUMENTS

| D. 125,944 | 3/1941 | Stickell | 119/109 |
|---|---|---|---|
| 431,402 | 7/1890 | Schneider | 119/114 |
| 2,902,976 | 9/1959 | Wilson | 119/109 |
| 3,099,250 | 7/1963 | Soles | 119/109 |
| 3,104,650 | 9/1963 | Grahling | 119/109 |
| 3,123,052 | 3/1964 | Marshall | 119/109 |
| 3,198,175 | 8/1965 | Dean | 119/109 |
| 3,266,464 | 8/1966 | Davis | 119/109 |
| 3,315,642 | 4/1967 | Rogers et al. | 119/109 |
| 3,318,288 | 5/1967 | Mullritter | 119/109 |
| 3,477,410 | 11/1969 | Lettieri | 119/109 |
| 3,512,223 | 5/1970 | Willinger | 119/109 |
| 3,752,127 | 8/1973 | Baker | 119/109 |
| 3,776,198 | 12/1973 | Gehrke | 119/109 |
| 4,018,189 | 4/1977 | Umphries et al. | 119/109 |
| 4,165,713 | 8/1979 | Brawner et al. | 119/109 |

Primary Examiner—Paul J. Hirsch
Attorney, Agent, or Firm—Pollock, Vande Sande & Priddy

[57] ABSTRACT

A stay assembly comprising a tether, a tether retracting mechanism carried by an animal collar and a slotted clip body carried by the belt of a person. One end of the tether is secured to a spool biased by a spring of the retracting mechanism and the other end of the tether has an enlarged member which is quickly attachable to and releasable from the slot of the belt clip body in which it is securely held by the tension applied to the tether by the spring biased spool. The animal collar may be attached to a wall of the retracting mechanism or pass through a channel within the housing of this mechanism.

11 Claims, 3 Drawing Sheets

U.S. Patent Dec. 18, 1990 Sheet 1 of 3 4,977,860
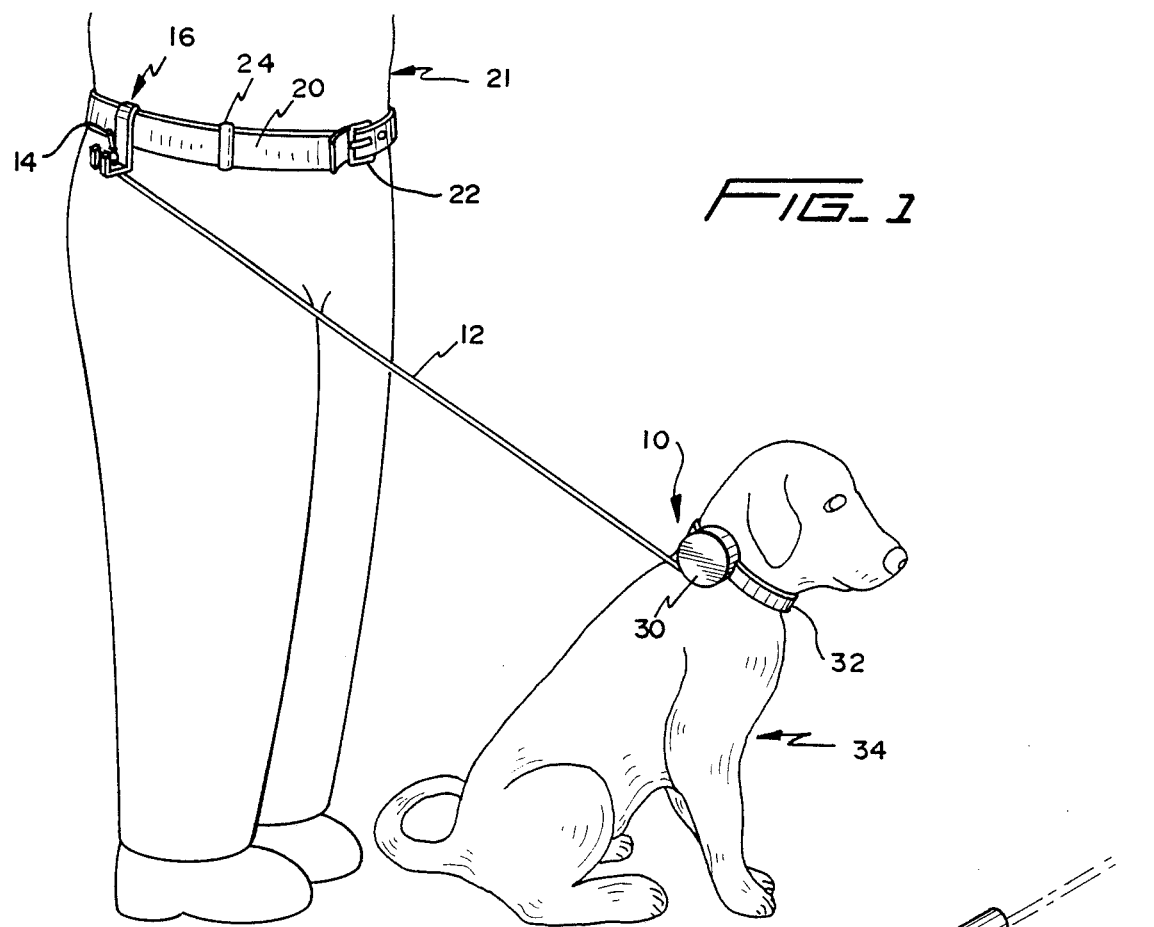
FIG_1
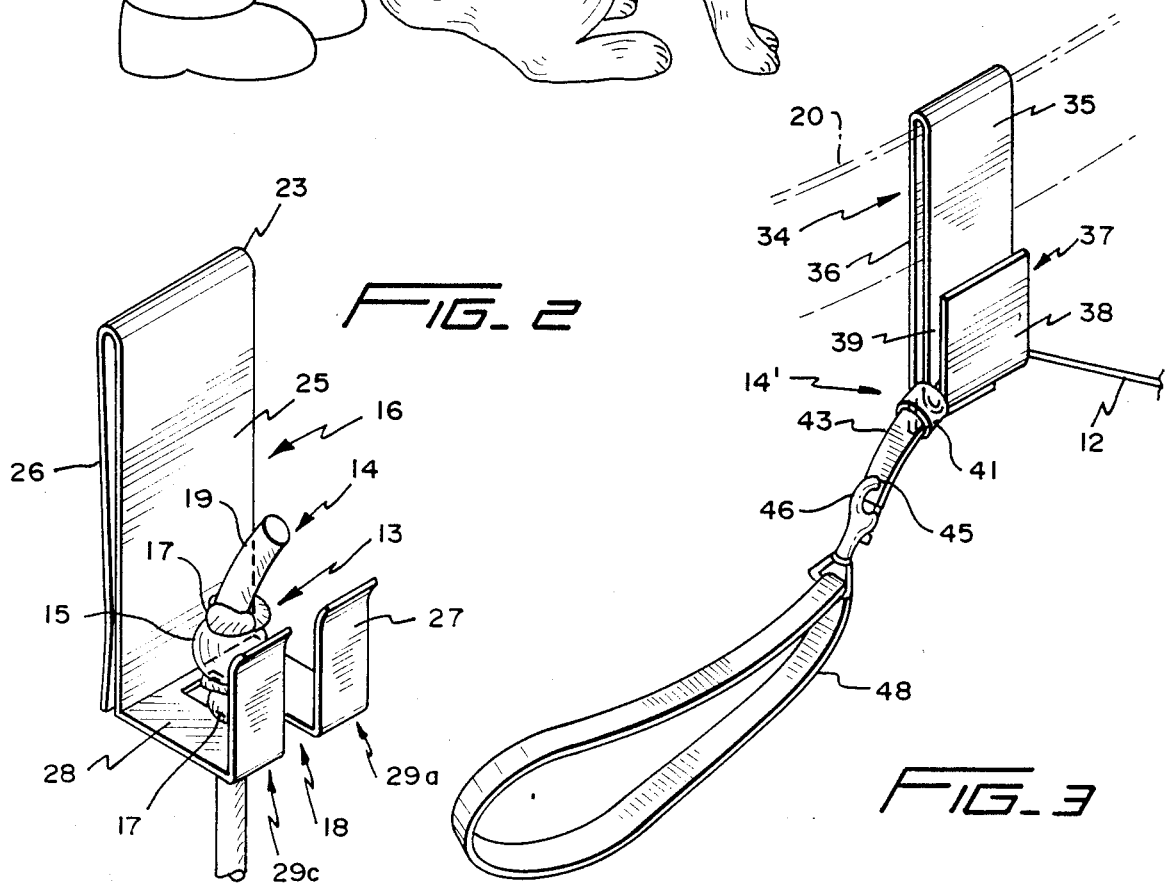
FIG_2
FIG_3

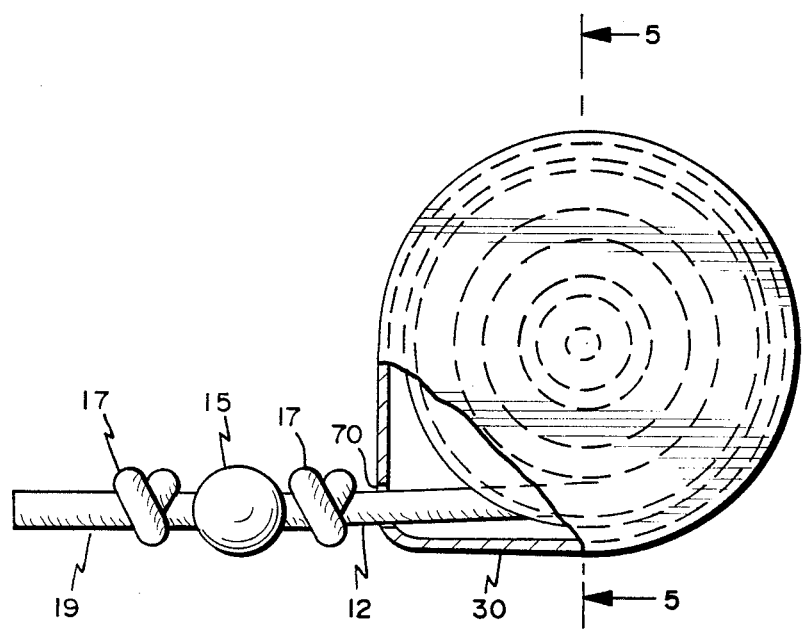
FIG_4
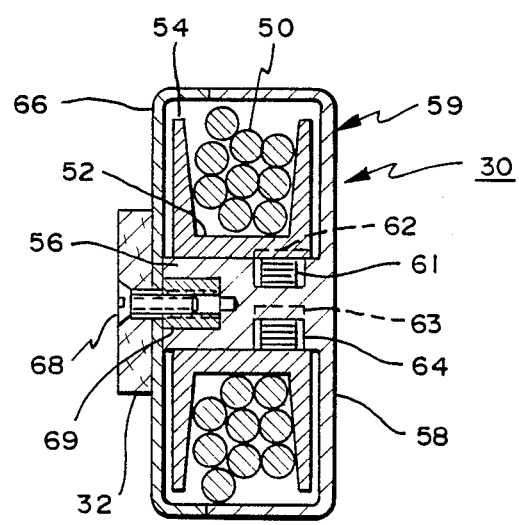
FIG_5

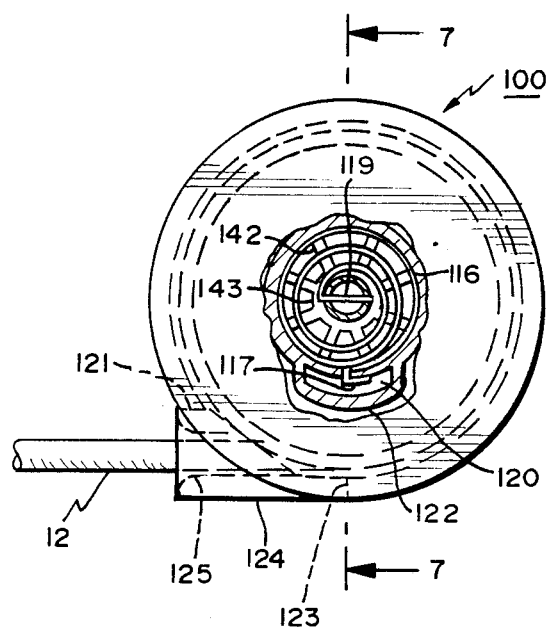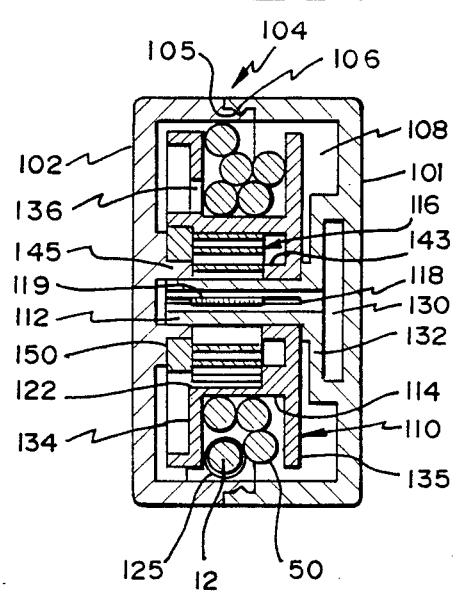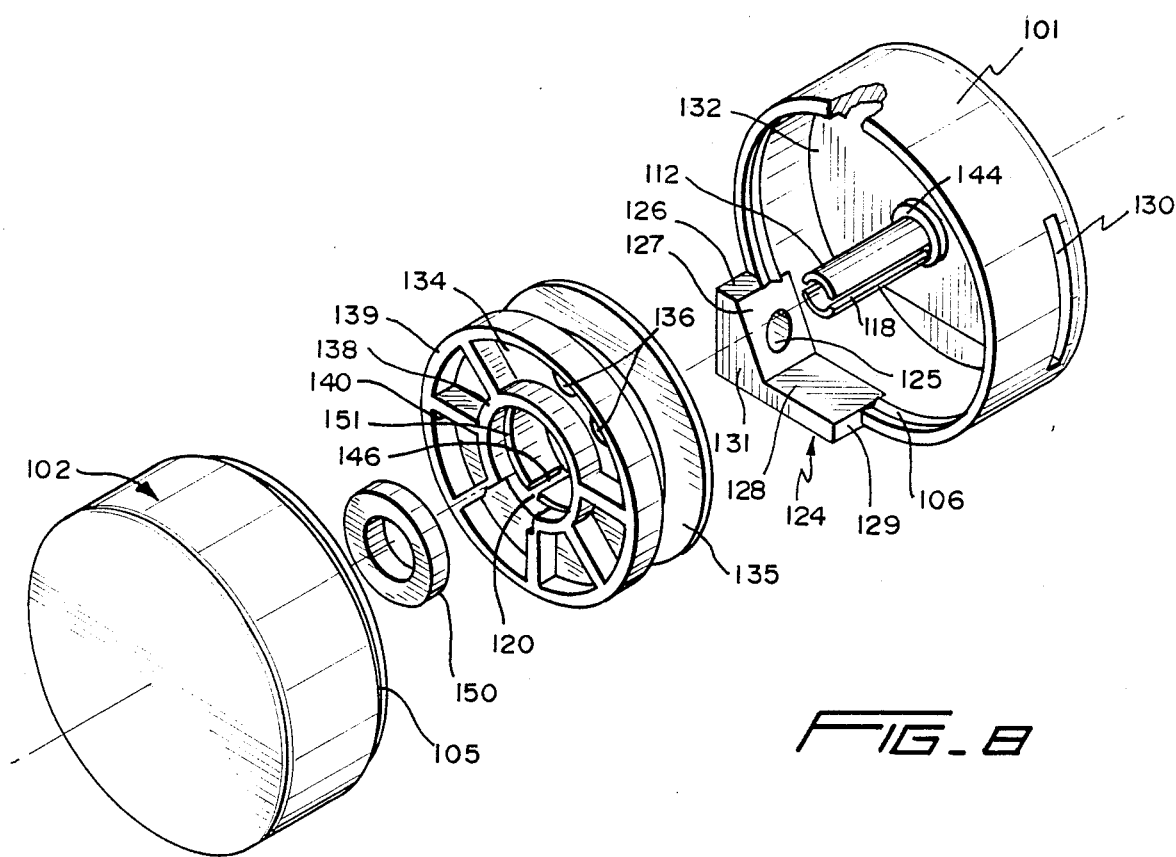

STAY ASSEMBLY FOR TETHERING ANIMALS

RELATED APPLICATIONS

This application is a continuation-in-part of application Ser. No. 07/364,890 filed June 12, 1989 copending.

TECHNICAL FIELD

This invention relates to retractable leashes for animals, and more particularly to a belt and collar mounted leash assembly for causing an animal, such as a retriever dog, to be conveniently stayed or released at the will of the person handling the animal.

BACKGROUND OF THE INVENTION

Although the present invention relates primarily to a device for the training of dogs, particularly retrievers, it is also useful as a stay and leash assembly for a variety of domestic animals. The invention is particularly useful for training a retriever to assist a hunter in finding and retrieving downed game which otherwise might be lost. In order to provide this assistance, it is necessary that the search efforts of the retriever be precisely controlled.

One characteristic of the control for which a retriever is trained is that the retriever must hold steady until told to retrieve, i.e., to commence its efforts to locate and retrieve the downed game. A mechanical device for providing such control is often necessary in the training and maintenance of a retriever. Various methods have been used in the past to affect the mechanical control necessary for insuring the steadfastness of a retriever. These include tying one end of a rope, leash or other tether to a collar around the neck of the retriever and (1) holding the other end of the tether by means of standing on it, (2) tying the other end to the belt of the trainer or other handler, or (3) attaching the other end to a stake or other device in the ground. All of these prior art methods have the drawback of seriously restricting the handler's ability to quickly release the tether from its securing means and thereafter, when the retriever returns with the game, to conveniently reattach the tether to the securing means. Another disadvantage is that where the other end is tied to the securing means, both the release and the reattachment require the use of both hands by the handler.

The foregoing release techniques contemplate releasing the tether at the end thereof secured at the handler such that the released tether trails behind and has to be dragged by the retriever during its retrieving efforts. This, of course, presents the possibility that the trailing tether will become snagged or otherwise hung-up on underbrush or the like and thereby terminate the retrieving efforts of the animal and possibly causing it to be hurt or lost. While this disadvantage may be overcome by instead untying the tether at the collar of the animal, this is even a more time consuming process than releasing the tether at the handler, especially where the handler is merely standing on an otherwise free end of the tether.

Disclosed in the prior art are retractable leash devices that may be carried on the collar of a dog or other animal. These devices overcome the disadvantage of having the animal drag the leash while retrieving downed game. Several such devices are shown in U.S. Pat. Nos. 3,477,410, 4,018,189 and 4,165,713. However, these devices still have the disadvantage of requiring that the other end of the leash be held constantly in one of the handler's hands until the retriever is released to find and retrieve the downed game. Obviously, with these devices, the handler cannot stay the retriever while at the same time using both hands to operate a gun to bring down the game. On the other hand, if the other end of the leash is tied to the handler's belt while the gun is operated, these devices have the same slow release disadvantage as the other tied tethers discussed above.

SUMMARY OF THE INVENTION

In view of the foregoing disadvantages of the prior art, a principal object of the present invention is to provide an apparatus and method for training an animal by first conveniently restricting its freedom of movement to the length of a tether and then, when desired, by quickly releasing the tether and having it immediately retract into a housing carried on the collar of the animal.

A further object of the invention is to eliminate the necessity of disengaging a tether from an animal at the connection between the tether and a collar on the animal by instead providing for quick and convenient release of the tether from a securing means carried on a belt worn by the handler.

Another object of the invention is to convert the release of a tethered animal from a two hand operation to a one hand operation.

A still further object of the invention is to provide an inexpensive and easily operable assembly for securely attaching to the belt of a handler one end of a leash tethered to an animal, and for allowing this belt secured end to be quickly released by the handler using one hand.

Other objects of the invention include eliminating the necessity of having the animal drag a leash upon its release by the handler, providing a means of conveniently attaching one end of a leash to and releasing it from a belt clip worn by the handler, providing a collar device carried by the animal for retracting the leash upon its release from the belt clip, providing a handle at the released end of the leash which remains exposed at the collar device so that it is ever present and readily accessible for the handler to regain control of the released animal, and providing means at the releasable end of the leash for attaching a detachable extension of the ever present handle so that the assembly of the invention also may serve as a conventional leash.

The foregoing objects are accomplished by a stay assembly which operates to control the movement of an animal by means of a tether attached at one end to the belt of the handler by a slotted clip device and at the other end to the collar of the animal by means of a tether retracting device. An enlarged member on the handler's end of the tether is engaged in the slot of the belt clip device worn on the belt of the handler and is held in this slot by constant tension on the tether provided by the spring mechanism of the tether retracting device. At any time desired, the handler may with one hand quickly remove the enlarged end member of the tether from the slot of the belt clip device and let go of the tether, at which time the tether is rapidly retracted into a housing of the retracting device on the animal collar and the animal is dispatched to make a retrieve.

When the tether is fully retracted, the enlarged end member serves as a stop at the entrance into the housing and a hand grippable member extends beyond the enlarged end member and remains exposed to serve as a tether handle. When the animal returns from its retrieve, this handle is easily regrasped by the handler to again stay the animal. Upon regrasping the handle, the handler draws the leash out of the retracting device on the collar of the animal and inserts the enlarged end member of the tether back into the slot of the belt clip device where it is again held in place by the spring tension of the retracting device.

BRIEF DESCRIPTION OF THE DRAWINGS

A further understanding of the operation, objects and advantages of the present invention may be gained from the detailed description below when read in conjunction with the accompanying drawings in which:

FIG. 1 is a perspective view of the invention as secured to the belt of a handler and the collar of a dog to keep the dog in a stayed position;

FIG. 2 is an enlarged perspective view of a belt clip device in accordance with the invention shown in FIG. 1;

FIG. 3 is an enlarged perspective view similar to FIG. 2 but showing a modified belt clip device and leash end structure in accordance with the invention;

FIG. 4 is an enlarged elevational view in fragmentary section of the leash retracting device of the invention shown in FIG. 1;

FIG. 5 is a sectional view of the leash retracting device of FIG. 1 taken along line 4—4 of FIG. 4;

FIG. 6 is an enlarged elevational view in fragmentary section of a modification of the leash retracting device in accordance with the invention;

FIG. 7 is a sectional view of the modified leash retracting device taken along line 7—7 of FIG. 6; and, FIG. 8 is an exploded perspective view of the modified leash retracting device of FIG. 6 from which the coil spring has been omitted for clarity.

DETAILED DESCRIPTION OF SPECIFIC EMBODIMENTS

Referring now to FIG. 1 of the drawings, the assembly of the invention is shown in use in its extended or "stay" condition wherein a tether or leash 12 is pulled to its fully extended position from a leash retracting device 10 and the extended end 14 thereof is securely engaged in a belt clip device 16. Extended end 14 includes an enlarged member, generally designated 13, which engages opposite edges of a slot 18 of the belt clip device 16 which is carried on a belt 20 of an animal handler, hunter or other person 21. Belt 20 has a buckle 22 and may include a belt loop 24 for receiving the end of the belt after it passes through the buckle.

The belt clip device 16 is made from a metal strip which has been bent back upon itself at 23 to form an inverted U-shaped belt hook having front and rear legs 25 and 26, respectively. Belt clip device 16 is preferably made of spring steel and the front and rear legs 25 and 26 thereof are bent toward each other so as to frictionally grip a belt forced therebetween. The inside surfaces of legs 25 and 26 may be roughened to increase this friction grip. If this friction grip is overcome by the animal pulling hard on leash 12, clip device 16 may travel along belt 20 until it engages either the loop 24 or the buckle 22, depending on which side of the buckle it is initially mounted. Other types of belt clamping mechanisms may be used as a part of device 16 and some of these clamps may prevent such travel. However, such travel does not interfere in any way with the operation or performance of the invention.

The outward portion of the belt clip body is bent to form an upstanding outer wall 27 and a transverse wall 28 connecting outer wall 27 to front leg 25. Walls 27 and 28 are provided with the slot 18 which in turn defines a pair of fingers 29a, 29c between which may be slipped a portion of tether 12 while the enlarged member 13 on end 14 is raised above the tips of fingers 29a, 29c.

The lease retracting device 10 includes a housing 30 which is secured as described below to a collar 32 around the neck of a dog 34. The collar 32 includes a conventional buckle (not shown) which is similar to the belt buckle 22 of belt 20, and the collar buckle is preferably positioned on collar 32 opposite to housing 30. The collar buckle is preferably about the same weight as retracting device 10 such that these two components balance each other on the dog's neck to keep retracting device 10 on one side of the dog's head and the collar buckle on the opposite side of the dog's head.

The belt clip device 16 is shown on the right side of the handler in FIG. 1 only for purposes of clarity. Where the handler is right handed, it is believed to be more convenient for belt clip device 16 to be at the handler's left side when the retracting device 10 is on the dog's right side. This allows the handler to hold a gun in his or her right hand while releasing the leash from the belt clip device with the left hand. Retracting device 10 also may be placed on either the right or left side of the dog's neck, although when on the left side, housing 30 should be inverted so that the outlet aperture 70 of housing 30 still faces rearwardly (but positioned upwardly instead of downwardly) as shown in FIGS. 1 and 4. Another option, of course, is to make a left side version of device 10, which would be a mirror image of that described below so that aperture 70 would be positioned both rearwardly and downwardly when on the dog's left side.

The enlarged member 13 at leash end 14 includes a bead 15 which slides onto the leash end and is held in position by two knots 17,17 tied in leash 12 on either side of the bead. The beaded end portion 14 therefore includes the bead 15, the two knots 17,17 and an extension 19. Beaded end portion 14 serves as a non-retractable handle and its overall length is preferably at least two inches and more preferably in the range of 3 to 5 inches to provide an easily grippable handle which hangs freely from the exterior of the retracting device 10 when the extensible section of the leash is fully retracted therein and enlarged member 13 is serving as a stop against housing 30. This handle length is still sufficiently short so as not to become easily hung-up on underbrush and the like or to interfere with the dog's movement during a retrieve.

In FIG. 3, there is illustrated a modified belt clip device 34 having front and rear legs 35 and 36, respectively, similar to front and rear legs 25 and 26 of belt clip device 16. However, in this embodiment of the belt clip device, a forward U-shaped hook portion 37 has an outer leg 38 bent upwardly along and in close proximity to front leg 35 of the inverted U-shaped portion which hooks over and frictionally engages the belt 20. Leg 38 and leg 35 define therebetween a relatively narrow slot 39 for receiving a corresponding longitudinal segment of leash 12. Accordingly, the gap of slot 39, as measured transversely to legs 35 and 38, preferably is only slightly larger than the diameter of leash 12. With this arrangement, an enlarged cap member 41 of rubber or plastic may receive a knot (not shown) in leash 12 so as to secure the corresponding end of the leash in slot 39. In the preferred embodiment shown, the knotted end of the leash is tied to a short strip of flexible material, such as leather or plastic, which serves as the primary grip or handle 43 of the leash.

The leash end of handle strip 43, which is toward the leash and covered by cap 41, contains a hole (not shown) through which the corresponding end of leash 12 is knotted. The outer end of handle strip 43 opposite to that tied to leash 12 may contain a second hole 45 for receiving the hook portion of a conventional spring loaded fastener 46 so that a conventional leash handle 48 may be attached as an auxiliary handle member. With conventional leash handle 48 attached to handle strip 43, the leash assembly of the present invention may serve the same functions as a conventional leash arrangement. However, the conventional leash handle 48 should not remain attached to handle strip 43 when the invention is used as a stay assembly because, upon release of the leash end portion 14' from belt hook 34 and retraction of the leash into the housing 30, it would be highly undesirable to have the loop of handle 48 dangling from the retracting device 10 while the dog is on a retrieve for the reasons already given above.

Referring now to FIGS. 4 and 5, the leash 12 is shown in its fully retracted position relative to housing 30. In the retracted position of leash 12, coils 50 thereof are wound around a drum 52 of a spool 54 mounted for rotation in housing 30 on a spindle 56 formed integrally with the bottom wall 58 of a housing base 59. The winding energy for retracting leash 12 is provided by a coiled spring 61 having one end bent and received in a slot 62 in the spool and the other end bent and received in a slot 63 in the spindle. A circumferential, groove-like chamber 64 is provided near the base of spindle 56 for housing spring 61.

A housing cover 66 mates with base 59 of housing 30 and is secured to spindle 56 by means of a flat head screw 68 threaded into a bushing 69 mounted in a corresponding hole tapped into the end of spindle 56. Screw 68 passes through the leather or other flexible material of collar 32 so as to secure housing 30 to the collar in addition to fixing together the base 59 and the cover 66 of the housing.

Screw 68 and bushing 69 preferably are made of brass and spring 61 preferably is made of stainless steel to prevent rust or corrosion in case water enters housing 30. The mating surfaces between cover 66 on the one hand and base 59 and spindle 56 on the other hand also may be secured together by a composition that is both an adhesive and a sealant to reduce the locations at which water may enter housing 30. However, it is likely that at least some moisture will enter housing 30 at the aperture 70 through which leash 12 passes between the interior and exterior of the housing.

The energy for retracting leash 12 is provided by the tensioning of spring 61 as its coils are tightened during the pulling of leash 12 to its full extensible length external to housing 30 as illustrated in FIG. 1. This spring tension in turn produces tension in leash 12 which causes the enlarged part on external leash end 14 to be held securely in the slot of the belt clip device, and also causes the belt clip device to be held securely on the belt 20. In this regard, the enlarged part of leash end 14 may be merely one or more knots in the material of the leash. However, the separate enlarged members herein disclosed are generally more resistent to wear and tear.

Referring now to FIGS. 6-8, there is shown a modified leash retracting device 100 having a generally cylindrical housing comprising a base 101 mated with and secured to a cover 102 by a detent structure 104. Detent structure 104 comprises a circumferential groove 105 on cover 102 which mates with and is engaged by a circumferential ridge 106 on base 101. Detent structure 104 detachably connects cover 102 to base 101 so that cover 102 can be pried off of the base 101 for exposing the internal mechanism of the leash retracting device for repair or replacement of worn or damaged parts. In other words, the small ridge 106, the sides of which preferably meet at an apex angle of about 90 degrees, can be slipped over the corresponding edge of the cover and into the small depression formed by groove 105 for a detent-like engagement which retains cover 102 on base 101. The sides of groove 105 also make an angle of about 90 degrees at the bottom of the groove. As evident from FIG. 7, the respective edge portions of the walls of the cover and the base are reduced in thickness adjacent to groove 105 and ridge 106 so that these thinner wall portions will flex sufficiently for the ridge to slip into the groove when the edges of the cover and the base are placed in opposing relation and then pressed firmly together. This mating operation is assisted by providing a draft (sloped surface) on the mating edges as described below.

Base 101 and cover 102 are thereby connected together by their respective peripheral walls to define an internal, generally cylindrical spool chamber 108. Similar to the embodiment shown in FIGS. 4-5, a spool 110 is rotatably mounted on a spindle 112 and spool 110 has a drum 114 on which are wound coils 50 of the leash 12 in response to the tension in leash 12 provided by a coiled spring 116. The inner end of coiled spring 116 is bent at 119 and placed in a slot 118 of spindle 112, and the outer end of spring 116 is bent at 117 and placed in a special chamber 120 defined by an auxiliary portion 122 of the wall of drum 114. While wall portion 122 is shown bumped out toward the side of drum 114 for receiving the leash coils 50, wall portion 122 instead could be bumped inward toward spindle 112, provided that the diameter of drum 114 were increased to provide sufficient space both for spring 116 and wall portion 122 in the spring chamber inside of drum 114.

Instead of merely having an opening for leash 12 similar to aperture 70 of the first embodiment, the second embodiment of FIGS. 6-8 includes a nipple piece 124 defining a passageway 125 for guiding the extension and retraction of leash 12 as shown best in FIGS. 6 and 7. Both entrances to passageway 125 are well rounded, preferably on a radius of at least 60 mils and more preferably at least 80 mils, to prevent fraying the leash as it passes back and forth through this passageway. Although nipple piece 124 may be formed separately and adhered to base 101 by an adhesive, nipple piece 124 preferably is molded integrally with base 101. In this regard, the components of housing 100 may be made of a suitable high impact plastic and formed by injection molding, with base 101, spindle 112 and nipple piece 124 being molded as a single integral piece. The peripheral wall of cover 102 is cut out as indicated by broken lines 121 and 123 in FIG. 6 so as to mate exactly with the rectilinear surfaces 126, 129 and 131 of nipple piece 124. The rectilinear surfaces 127 and 128 on the inside of nipple piece 124 intersect at an angle preferably within the range of about 110 to 140 degrees, more preferably at about 130 degrees, so as not to take up much space within spool chamber 108.

Another special feature of the second embodiment, which is not found in the first embodiment, is the provision of a channel 130 of rectangular cross section for receiving belt 20 so that it passes directly through base 101 of the housing. Channel 130 is defined by an inwardly projecting auxiliary wall 132, which is integrally formed with the rear wall of base 101 and extends entirely across the rear side of spool chamber 108 as seen best in FIG. 8. With the screw attachment for collar 32 as shown in FIG. 5, a vine, wire or other string like element may occasionally work its way between the collar 32 and the outer surface of cover 66 so as to interfere with an animal's freedom of movement or restrain its movement at an inopportune time. This potential problem with the first embodiment is overcome by the second embodiment wherein the collar passes directly through the housing and thereby does not provide a juncture in which an extraneous vine, string, wire or the like can become caught. Collar 32 is preferably made of a material, such as leather, that is both flexible and resiliently compressible. When collar 32 is made of such material and one or both of the cross-sectional dimensions of channel 130 are made slightly less than the corresponding dimension(s) of the collar, housing base 101 frictionally engages the collar so as to fix the position of device 10 on the collar relative to its buckle.

The spool 110 has opposing sidewalls 134 and 135 for guiding coils 50 onto drum 114 of the spool. Wall 134 is provided with a pair of apertures 136—136 through which the spool end of leash line 12 is tied so that the leash cannot be separated from the retracting device 10. For increasing the rigidity of wall 134, this wall may be made integral with inner and outer peripheral walls 138 and 139, respectively. The rigidity of these walls may be further increased by providing a plurality of interconnecting ribs 140. These peripheral walls and ribs are provided instead of making wall 134 of equivalent thickness to provide for rapid cooling of the spool without distortion after an injection molding process. Two of these ribs also define a space for receiving the segment of leash 12 passing through holes 136—136. As may be seen in FIG. 6, similar ribs 142 are provided along and inside of spool wall 135 between the cylindrical wall of drum 114 and a cylindrical bearing wall 143 for engaging a corresponding bearing portion near the base of spindle 112. The ribs 142 avoid an overly thick section of spool wall 135 in a manner similar to ribs 140. A bearing seat 144 also is provided on the exterior of channel wall 132 and a cylindrical bearing wall 145 is provided on the inside of cover 102, adjacent to the corresponding ends of spindle 112.

As seen best in FIG. 8, the inner wall of chamber 120 has a slot 146 for receiving the bent outer end 117 of spring 116. After the installation of the spring, the outer end of slot 146 is covered by a washer-like cap 150 which is received in a countersink 151 so as to close the spring chamber defined by the inner surface of drum wall 114. The mating outer surface of cap 150 and inner mating surface of peripheral wall 138, as well as the other mating surfaces of the various components, including the thin edge portions of base 101 and cover 102, preferably have a draft of about 1 degree so as to be readily engageable and releasable, but firmly held in place by friction when fully seated. The 1 degree draft is preferably positive on all outside dimensions and negative on all inside dimensions of mating surfaces.

As is clear from the foregoing description, the stay assembly of the present invention includes both a belt mounted quick release device for one end of an animal leash and a leash retracting device mounted on the collar of the animal at the opposite end of the leash. Thus, part of the assembly is mounted around the waist of the handler and another part of the assembly is mounted around the neck of the animal, and these parts may be readily and quickly connected and disconnected by means of the leash. These parts may be positioned on either side of the handler and animal, respectively, as determined by which side of the handler the animal will be stationed for a retrieving operation, and which hand is to be used by the handler in attaching and/or detaching the leash. The exit point of the leash from the retracting device may be changed as appropriate to take into account this relative positioning of the handler and the animal.

The leash 12 may be any conventional type of leash, but preferably is a braided cord of natural fiber approximately 36-inches in length when fully extended from the retracting device. A natural fiber is preferred over a synthetic fiber, or a chain or wire, so that the animal can chew through the leash if it somehow becomes hung up during a retrieve or when the animal is left unattended.

The extended end of the leash preferably carries a bead or other hard component of increased diameter so as to engage the edges of the slot into which the adjacent portion of the leash may be slipped to anchor the extended end at the belt of the handler. The anchoring arrangements disclosed for the extended end of the leash allows total freedom of the handler to use a firearm or other weapon to bring down game or to use both hands for paddling, game calling and the like. Thereafter, the extended end of the leash can be quickly released by one hand in order for the dog or other animal to retrieve the game. Although the length of the leach windable on the spool is fixed, the length of the leash between the spool housing and the belt clip device may be adjusted by repositioning the knot or knots for holding the bead or cap in any position desired along the extended length of the leash.

When the enlarged part of the leash is released from the belt clip device, the leash quickly retracts into the housing of the retracting device 10 or 100 to the point at which the bead, cap or knot engages the housing exterior. This leaves approximately 2 to 5 inches of leash cord or an attached strip as a handle that may be readily gripped at the animal collar. The length of this handle may be adjusted in the same manner as the method described above for adjusting the length of the leash. This handle is ever present and easily grasped to regain control of the animal in a hunting and/or training situation. As previously indicated, it also is a distinct convenience to both the handler and the animal not to have a leash trailing after the animal when it is in a retrieving mode.

As will be readily appreciated by animal handlers, the different parts of the assembly may be constructed in any suitable size for any desired size animal. Similarly, both the extensible leash portion and the handle portion of the leash line may have any length or diameter suitable for the specific animal and/or handling situation for which the stay assembly is to be constructed.

While the present invention has been illustrated and described by means of specific embodiments, numerous changes and modifications will occur to persons skilled in the art and these may be made without departing from the scope of the invention as defined in the claims below.

What is claimed is:

1. A stay assembly attachable to a belt on a person and to a collar on an animal to be controlled, said assembly comprising:

a housing, means for attaching said housing to said collar, a flexible tether, retracting means secured to one end of said tether for tensioning the same and operable to retract said tether into said housing, clip means having a body defining a slot for receiving the other end of said tether and means for attaching said body to said belt, and handle means located at said other end of the tether and including an enlarged member for engaging opposing edges of said slot to hold an adjacent segment of said tether in said slot at all times while said person is upright and said tether is tensioned by said retracting means, said belt attaching means causing the slot in the body of said clip means to be held in a position relative to said belt such that said tether is quickly released from said clip means by one hand of said person gripping and moving said handle means so that said enlarged member no longer engages the edges of said slot and said adjacent segment of the tether is removed from said slot, and the distance between said enlarged member of said handle means and a free end thereof defining a handle component held at the exterior of said housing by said enlarged member when an extensible section of said tether is fully retracted into said housing.

2. The stay assembly of claim 1 in which said clip means comprises two upstanding walls connected by a bottom wall and said slot passes through one of said upstanding walls and into said bottom wall a distance sufficient for said enlarged member to rest on said bottom wall on either side of the portion of the slot therein.

3. The stay assembly of claim 1 in which said slot is defined by a gap between two upstanding walls of said clip body extending parallel to each other and spaced apart by the distance of said gap.

4. The stay assembly of claim 1 wherein said handle means comprises a main handle member with one end attached to the extensible portion of said tether, an auxiliary handle member, and means for detachably securing said auxiliary handle member to the other end of said main handle member.

5. A stay assembly according to claim 1 wherein said housing defines a channel passing through the interior thereof and extending between opposing openings in a peripheral wall of said housing, said channel being adapted to receive said collar and support said housing thereon.

6. The stay assembly according to claim 5 wherein the material of said collar is compressible and at least one cross-sectional dimension of said channel is slightly less than a corresponding dimension of said collar such that opposing walls of said channel frictionally engage said collar to resist relative movement between said collar and said housing.

7. The stay assembly according to claim 1 wherein said housing comprises a pair of spaced apart generally flat side walls and a peripheral wall extending between said sidewalls to define a generally cylindrical cavity, and wherein said stay assembly further comprises a spool rotatably mounted within said cylindrical cavity on a spindle fixed to one of said sidewalls, and a coil spring fixed at one end to said spindle and fixed at the other end to said spool, said coil spring providing a spring force acting on said spool for causing said flexible tether to be wound about said spool when said other end of the tether is released from said belt clip means.

8. A stay assembly according to claim 7 wherein one of said sidewalls and a portion of said peripheral wall form a housing base and the other sidewall and another portion of said peripheral wall form a cover, said base and said cover each having a mating edge for engaging the mating edge of the other and said mating edges defining a detent structure making said cover selectively attachable to and detachable from said base.

9. A stay assembly according to claim 7 wherein said housing further comprises a nipple component carried by said peripheral wall, said nipple component defining a passageway for guiding said tether through the peripheral wall of said housing.

10. A stay assembly according to claim 9 wherein said nipple component is formed integrally with at least a portion of said peripheral wall.

11. A stay assembly according to claim 9 wherein openings lead into said passageway at opposite ends thereof and the edges of said openings are rounded on a substantial radius.

* * * * *